United States Patent [19]

Myojo

[11] Patent Number: 4,722,491

[45] Date of Patent: Feb. 2, 1988

[54] PIVOTALLY OPENING HOUSING FOR A SPINNING REEL

[75] Inventor: Seiji Myojo, Osaka, Japan

[73] Assignee: Shimano Industrial Company Limited, Osaka, Japan

[21] Appl. No.: 842,662

[22] Filed: Mar. 21, 1986

[30] Foreign Application Priority Data

Mar. 22, 1985 [JP] Japan .................... 60-41993

[51] Int. Cl.⁴ .................... A01K 89/01; A01K 89/02
[52] U.S. Cl. .................... 242/84.2 R; 242/84.2 A; 242/84.5 A
[58] Field of Search .................... 242/84.2 A, 84.21 A, 242/84.5 A, 84.51 A, 84.5 P

[56] References Cited

U.S. PATENT DOCUMENTS

| | | | |
|---|---|---|---|
| 2,932,465 | 4/1960 | Johnson | 242/84.2 A |
| 3,521,830 | 7/1970 | Hull | 242/84.2 A |
| 4,456,194 | 6/1984 | Noda | 242/84.2 A |

FOREIGN PATENT DOCUMENTS 1120204 12/1961 Fed. Rep. of Germany ..... 242/84.2 A
58-70771 5/1983 Japan .

*Primary Examiner*—Billy S. Taylor
*Attorney, Agent, or Firm*—Stevens, Davis, Miller & Mosher

[57] ABSTRACT

In a closed face reel a spool is supported on a base member of a main body of the reel. A driving mechanism is provided for driving a rotary member to wind a fishing line onto the spool. A cover is provided for the main body with the cover being divided into separate divided portions along the axis of the spool. The divided covers are capable of opening and closing relative to one another. A maintaining device is provided to maintain the cover in the closed condition after it has been closed.

7 Claims, 9 Drawing Figures

PIVOTALLY OPENING HOUSING FOR A SPINNING REEL

FIELD OF THE INVENTION

This invention relates to a fishing reel, and more particularly to a so-called closed face reel having a main body including a base member supporting a spool, a rotary member for winding a fishing line on the spool, a driving mechanism for driving the rotary member, and a cover covering the main body of the reel.

BACKGROUND OF THE INVENTION

Generally, the above-described type of fishing reel is mounted on a fishing rod through a mounting leg attached to the base member, so that during fishing an angler uses his hand to grip the upper portion of the reel together with the fishing rod.

This type of reel, as disclosed in Japanese Utility Model Laid-Open Gazette No. Sho 58-70,771, includes a base member comprising a mounting leg for the fishing rod, a disc-like support member extending upwardly therefrom, and a tubular shaft projecting forwardly from the support member; a spool and a rotary member supported to the tubular shaft; a driving mechanism having a plurality of gears and supported at the rear side of the support member; and a cover divided along a line perpendicular to the axis of the spool into front and rear divided parts each of which are cylindrical in shape and with a closed bottom. The divided covers are mounted on the front and the rear of the support member by a mounting means, such as a screw.

The type of conventional reel constructed as described above has seams between the support member and the front and rear divided covers. Hence, when the angler grips the reel through the cover for fishing, the seams make contact with the palm of the angler's hand, or if a stepped portion is formed at the seam, the stepped portion will press against the angler's palm, resulting in discomfort. Also, each divided cover should be removed at times for lubricating or cleaning the interior of the reel, which is very troublesome.

If the fishing line becomes caught by the spool, or is cut thereby, the cover must be removed to mend the line. In this event, the front divided cover should be unscrewed from the support member and moved axially frontward relative thereto, whereby the front divided cover, when intended to be removed in condition of mounting the reel onto a reel seat at the fishing rod, requires a predetermined clearance from the outer periphery of the rod. In other words, the mounting leg needs an increase in vertical length with respect to the cover. However, when the mounting leg is larger in vertical length, the angler cannot easily grip the reel and rod together with his hand. Also, since the fishing line drawn out from the spool is to be retained on the inner surface of the front end at the front divided cover, the cylindrical front divided cover should be used. Hence, the reel is restricted in design and is difficult to form such that it can easily mate with the angler's hand gripping the reel.

SUMMARY OF THE INVENTION

An object of the invention is to provide a fishing reel whose cover for the main body is divided along the axial direction of the spool into two vertical portions so as to eliminate the seams on the upper surface of the cover, whereby the cover can be disposed close to the outer periphery of the rod without restriction due to the removal of the cover, so that the reel and rod are made easy to grip. For example, an elliptic divided cover includes one portion which is supported to the other such that it can freely open and close relative thereto. As a result, when the reel is being lubricated or is receiving other servicing, merely one divided cover need be opened to expose the interior of the entire main body of the reel.

A closed face reel according to the present invention comprises a main body including a base member supporting a spool, a rotary member for winding a fishing line onto the spool, and a driving mechanism for the rotary member. The reel also includes a cover for covering the main body, with the cover being divided along the axial direction of the spool into two first and second vertically divided covers. One of the divided covers is fixed to the main body, and the other is mounted on the former divided cover to be freely opened and closed relative thereto. The reel also includes maintaining means for maintaining the first and second divided covers in a closed condition.

The first and second divided covers have no vertically annular seam, but rather an axial one, thereby allowing the angler to grip the reel without touching a seam with the palm of his hand which he uses to grip the reel and rod together. Thus, he can comfortably grip the reel and rod together while avoiding pain. Also, the divided covers can be vertically opened or closed without restriction so as to be disposed close to the outer periphery of the rod. Hence, the angler can moderately grip the reel and rod together.

Furthermore, a cover having an elliptic-shaped and being axially longer is easy to grip and since only one divided cover need be opened to expose the entire main body to the exterior, lubrication and cleaning of the interior of the cover as well as servicing of a line cut or caught by the spool are facilitated.

In addition, the cover is formed of synthetic resin, with the first divided cover being fixed to the base member and the second one pivoted to the first divided cover.

The above and further objects and novel features of the invention will be more fully apparent from the following detailed description when read in connection with the accompanying drawings.

DETAILED DESCRIPTION OF THE INVENTION

Figure 1:
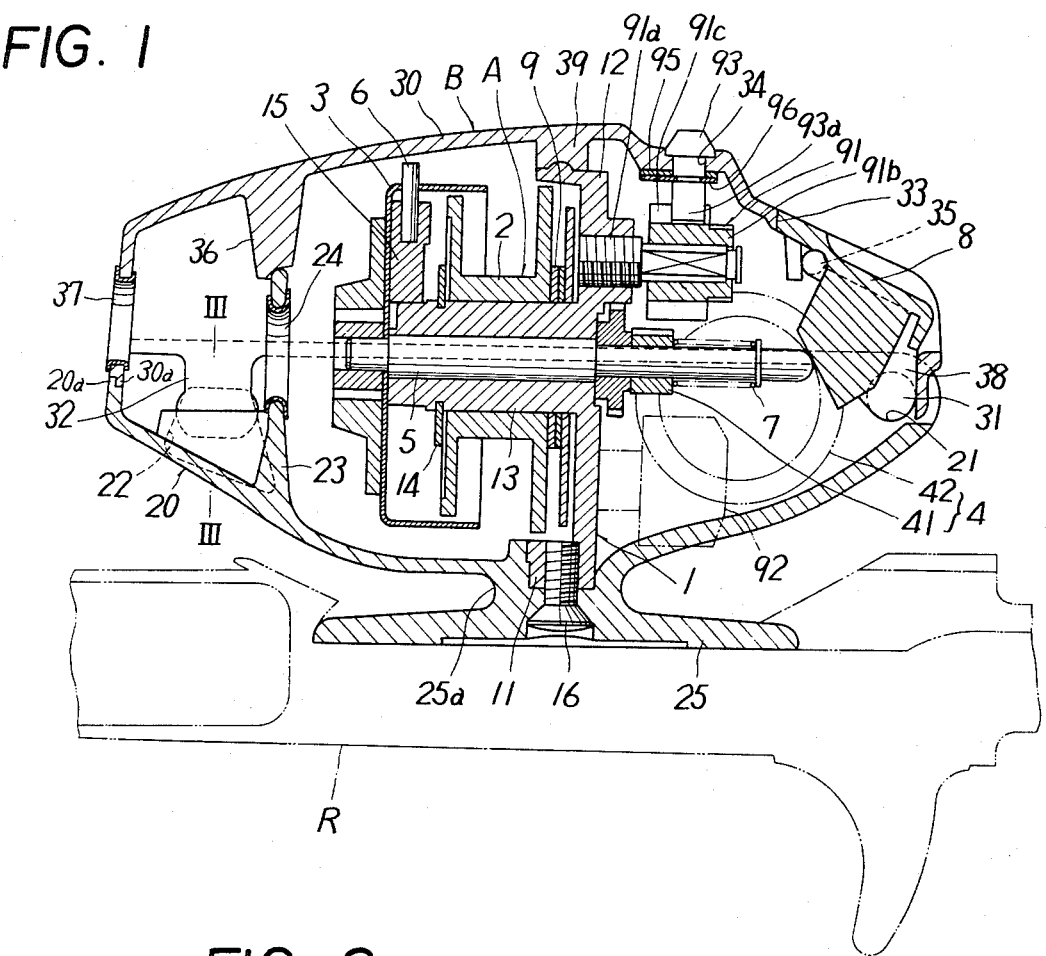
FIG. 1 is an enlarged longitudinal sectional view of an embodiment of the fishing reel of the invention.

Referring to FIG. 1, a closed face fishing reel is shown which comprises a main body A supporting on a base member 1 a spool 2, a rotary member 3 for rotating therethrough a fishing line onto the spool 2, a driving mechanism 4 for the rotary member 3, and a cover B for covering the main member A. Base member 1 comprises a support member 12 having at a lower portion thereof a mounting nose 11. A tubular shaft 13 projects forwardly from the front surface of the support member 12. Cover B is vertically divided along the axial direction of the spool 2 into two divided parts.

The spool 2 is supported rotatably onto the outer periphery of the tubular shaft 13 and restrained by a stopper 14 from axially outward movement. The tubular shaft 13 supports within its center bore a rotary shaft 5. Shaft 5 can rotate and slide within this outer bore. Rotary shaft 5 carries at its fore end the rotary member 3 which has a cup-like shape with an annular edge. A line guard 6 for hooking therethrough the fishing line to be wound onto the spool 2 is provided at the rotary member 3 such that it is radially movable into or out of the rotary member 3. A pinion 41 is supported slidably to a rear extension of the rotary shaft 5, and a return spring 7 for biasing the rotary shaft 5 rearwardly from the support member 12 is interposed between the pinion 41 and the end of the rear extension of rotary shaft 5. An arm (not shown) projects rearwardly from the support member 12 and rotatably supports a handle shaft (not shown) having a master gear 42 in mesh with the pinion 41. An operating lever 8 is pivoted to the cover B and is pushed to move the rotary shaft 5 and cup-like rotary member 3 forwardly of the support member 12 against the return spring 7. The line guard 6 is moved radially into the rotary member 3 to release the fishing line. On the other hand, the handle shaft is rotated to rotate the rotary shaft 5 and rotary member 3 and move the line guard 6 radially out of the rotary member 3 so that the line is wound through the line guard 6 onto the spool 2.

A cam 15 is provided at the outer periphery of the utmost end of the tubular shaft 13, thereby controlling the line guard 6. When the rotary member 3 moves forwardly, the line guard 6 falls into a lower portion of the cam 15 and moves into the rotary member 3. When the rotary member 3 rotates in such condition, the line guard 6 is raised to a higher portion of the cam 15 and moves radially out of the rotary member 3. Between the spool 2 and the front surface of support member 12 is interposed a drag washer 9 opposite to one side surface of spool 2 and supported onto the tubular shaft 13. Support member 12 rotatably carries an adjuster 91, for adjusting the thrust of the drag washer 9 to the spool 2, and a drag thumbscrew 92.

Figure 2:
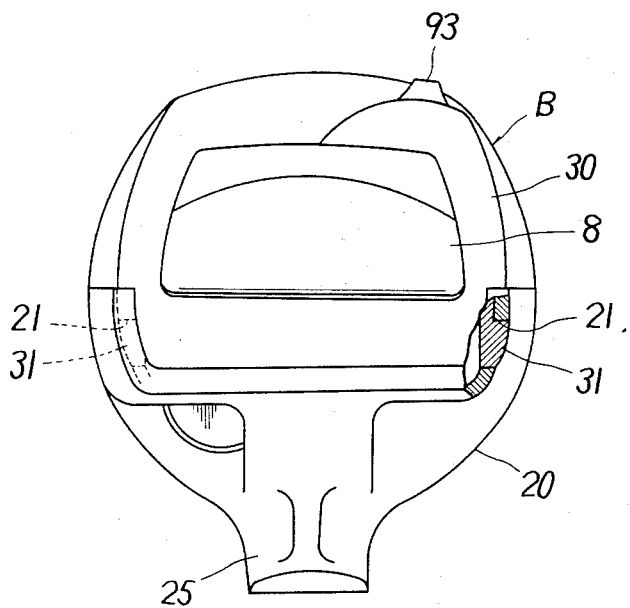
FIG. 2 is a rear view of the FIG. 1 embodiment.

In the embodiment shown in FIGS. 1 and 2, the cover B is divided vertically along the axial direction of the spool 2 to form first and second divided covers 20 and 30 each having a longitudinal elongate cup-like shape. The lower first divided cover 20 is integral with a mounting leg 25, fixed to the main body A. Cover 20 includes at its lengthwise rear end and both side surfaces a pair of horizontal bores 21. Cover 20 includes at its lengthwise front end and both side surfaces a pair of retaining bores 22. The upper second divided cover 30 is provided at its lengthwise rear end with a pair of horizontal shafts 31 integrally projecting therefrom and perpendicular to the axis of the spool 2. Horizontal shafts 31 are fitted into the bores 21 of first divided cover 20, thereby supporting the second divided cover 30 pivotally to the first divided cover 20 to enable opening and closing thereto. Also, the second divided cover 30 is provided at its lengthwise fore end with a pair of engaging projections 32 integral with the cover 30. The engaging projections 32 and retaining bores 22 constitute a maintaining means by which the second divided cover 30 is maintained in its closed condition through engagement of the engaging projections 32 with the retaining bores 22.

Figure 4:
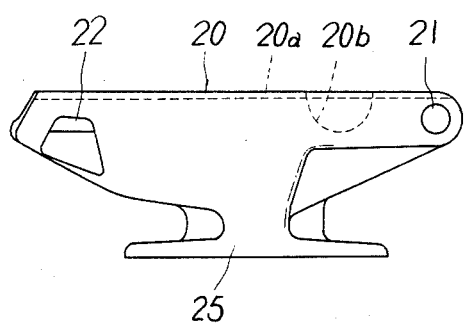
FIG. 4 is a side view showing only a first divided cover intergral with a mounting leg.
Figure 5:
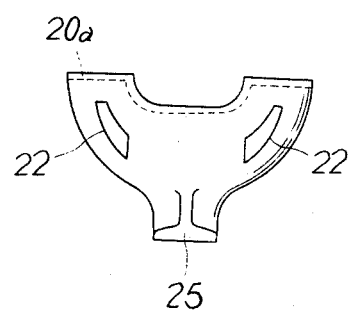
FIG. 5 is a front view of the first divided cover.

Also, the divided covers 20 and 30 are formed of synthetic resin respectively. First divided cover 20 is provided at its front position with a rising 23 which carries at its utmost end a ring-like-shaped line guide 24. Each retaining bore 22 is tapered from its widthwise inner end toward its widthwise outer end as shown in FIGS. 4 and 5.

A window 33 and a guide bore 34 are provided at the rear portion of the second divided cover 30. The operating lever 8 pivoted to the second divided cover 30 through a pair of stems 35 faces the window 33. A drag lever 93 having an end 93a engageable with the adjuster 91 projects through the guide bore 34 such that it moves in reciprocation. A pusher 36 which abuts against the upper edge of the line guide 24, and a line guide ring 37 are provided at the fore end portion of the second divided cover 30.

Figure 3:
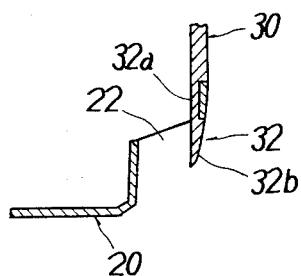
FIG. 3 is a sectional view taken on the line III—III in FIG. 1.
Figure 6:
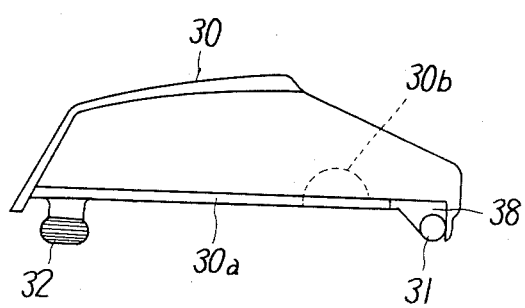
FIG. 6 is a side view showing only a second divided cover.
Figure 7:
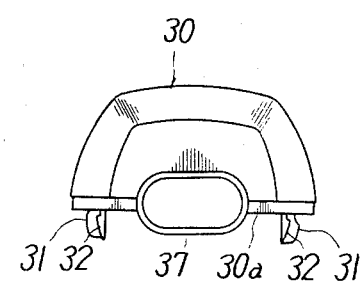
FIG. 7 is a front view thereof.
Figure 8:
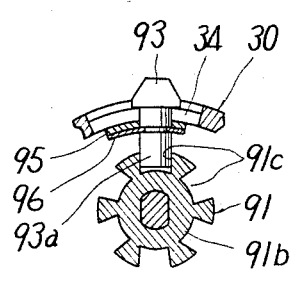
FIG. 8 is a sectional view of a drag-adjusting member.

The horizontal shafts 31 of second divided cover 30, as shown in FIGS. 6 and 7, are integral with the end face of the cover 30 through downward projections 38 and extend outwardly and are made smaller in length. Each engaging projection 32, as shown in FIG. 3, is thin at its root and has a retaining portion 32a and a pinch end 32b at its utmost end. The pinch ends 32b are pinched by the angler's fingers from the outside to deflect the roots and are then fitted into the retaining bores 22, whereby the roots are elastically restored to retain the retaining portion 32a to the edge of the retaining bore 22. Pinch ends 32b are exposed from the surface of the first divided cover 20 through the retaining bores 22 such that they can be pinched from the exterior of the divided cover 20.

The divided covers 20 and 30 are provided at the cut edges with fitting stepped portions 20a and 30a which are fitted with each other such that the surfaces at the cut edge portions of first and second divided covers 20 and 30 are made level. Alternatively, the divided covers 20 and 30 may abut at the cut edges against each other without using the fitting stepped edges 20a and 30a.

Also, the first and second divided covers 20 and 30 are provided at their portions opposite to the handle shaft with semicircular recesses 20b and 30b which are large enough to mate with the handle shaft.

A rib 39 is provided at a lengthwise intermediate portion of the second divided cover 30 and abuts against the upper surface of the support member 12 as shown in FIG. 1. A window (not shown) is provided at the first divided cover 20, thereby exposing the drag thumbscrew 92 to the exterior.

Figure 9:
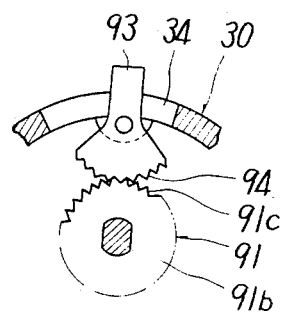
FIG. 9 is a sectional view of another example thereof.

Referring again to FIG. 1, the adjuster 91 comprises an adjusting screw 91a screwable with the support member 12 and an adjusting tube 91b supported non-rotatably relative to the adjusting screw 91a and having at its outer periphery a plurality of engaging grooves 91c. The adjusting tube 91b is rotated when the second divided cover 30 is open, so as to forwardly or backwardly screw the adjusting screw 91a, thereby setting an initial load on the drag washer 9. When the second divided cover 30 closes, the engaging end 93a at the drag lever 93 supported to the second divided cover 30 engages with one engaging groove 91c, so that when the drag lever 93 in this condition is moved to thereby enable the thrust of the drag washer 9, i.e., a drag force, to be adjusted in a range corresponding to the size of the guide bore 34. In addition, the engaging groove 91c is substantially U-shaped in section and may alternatively be substantially V-shaped as shown in FIG. 9. In this case, the drag lever 93 is pivoted to the second divided cover 30 and provided at its utmost end with teeth 94 engageable with the V-shaped recess 91c so that the drag lever 93 is operated in swinging motion to thereby adjust the drag force. In addition, in FIG. 12, reference numeral 95 designates a leaf spring, 96 designates a set screw, and 16 designates a screw for fixing the first divided cover 20 to the base member 1.

In the fishing reel of the invention, the horizontal shafts 31 at the second divided cover 30, while bending the support ends 38, are fitted into the bores 21 at the first divided cover 20 respectively, thereby supporting the second divided cover 30 to first divided cover 20 such that it can open and close around the horizontal shafts 31. Engaging projections 32 are pinched from the exterior to be fitted and retained into the retaining bore 22, thereby keeping the second divided cover 30 in a closed condition.

When the cover B is open for cleaning the interior or for mending a cut line, the pinch ends 32b exposed to the exterior are pinched therefrom to disengage the engaging projections 32 from the engaging bores 22 and the second divided cover 30 is turned upwardly around the horizontal shafts 31 to open it.

Since the cover B is vertically divided, the first divided cover 20 fixed to the main body A is not restricted by the opening of second divided cover 30, thereby enabling it to be moved close to the outer periphery of the fishing rod R as shown in FIG. 1. Hence, the size of grip of the angler's hand gripping the cover B together with the fishing rod R can be reduced and the neck 25a of the mounting leg 25 can be sufficiently large in its longitudinal width, thereby increasing strength of the mounting leg 25.

Alternatively, the mounting leg 25 may be integral with the base member 1, or separate from the cover 20 and base member 1 so as to be fixed thereto. Also, the second divided cover 30 may be supported to the main body A so that it can be freely opened and closed relative thereto.

Alternatively, the first divided cover 20 may be provided integrally with the horizontal shafts 31 and the second divided cover 30 with the horizontal bores 21. The horizontal shafts 31 may be separate from the first or second divided cover 20 or 30, in which the supporting means is not particularly defined.

Also, the second divided cover 30 may alternatively be supported at the fore end to the first divided cover 20 and provided at its rear end with the maintaining means.

Alternatively, the maintaining means may use, instead of the engaging bores 22 and engaging projections 32, a set screw, a holder having a hook, or a retaining pin, the construction of which is not particularly defined.

Also, the second divided cover 30 may be disposed below the main body A and fixed thereto and the first divided cover 20 may be disposed above. In this case, the first divided cover disposed at the upper side is fixed to the base member and the mounting leg is integrally mounted on the second divided cover.

The cover B may alternatively be open or closed transversely, which is not particularly defined by the manner by which the upper divided cover is opened and closed.

While an embodiment of the invention has been shown and described, the scope of the invention is not limited to the specific construction illustrated in the specification and drawings, which is merely exemplary of the invention rather than defined or limited.

What is claimed is:

1. A fishing reel comprising
   a main body including a base member having (i) a support member which includes a mounting nose on one end thereof, and (ii) a tubular shaft projecting from one side surface of said support member,
   a rotary shaft disposed within said tubular shaft of said base member,
   a spool supported on an outer surface of said tubular shaft of said support member,
   a rotary member supported on said rotary shaft, for winding a fishing line onto said spool,
   a driving mechanism for driving said rotary shaft and said rotary member, and
   a cover member covering said main body, said cover member including first and second divided covers which are divided vertically relative to one another at a horizontal plane extending along the axial direction of said spool, said first and second divided covers covering said main body, said rotary shaft, said spool, said rotary member and said driving mechanism in their entirety, said first divided cover being fixed at an intermediate portion by a fixing means to said mounting nose of said base member at said main body, said second divided cover being pivotally connected at an end portion thereof to a corresponding end portion of said first divided cover so that when said second divided cover is pivoted to an open position relative to said first divided cover, said main body, said spool, said rotary shaft, said rotary member and said drive mechanism are exposed to the outside, said cover member further comprising a maintaining means for maintaining said first and second divided covers in a closed position relative to one another.

2. A fishing reel according to claim 1, wherein said maintaining means is formed between said first and second divided covers at another end portion of said first divided cover opposite to said end portion thereof at which said second divided cover is pivoted.

3. A fishing reel according to claim 1, wherein a mounting leg is integral with said first divided cover and positioned below said first divided cover.

4. A fishing reel according to claim 1, wherein said maintaining means comprises engaging bores and engaging projections engageable therewith.

5. A fishing reel according to claim 4, wherein said engaging projections comprise pinch portions, and said pinch portions, when engaged with said engaging bores, are exposed through said engaging bores to the exterior.

6. A fishing reel according to claim 1, wherein said main body comprises a drag washer for applying a drag force against rotation of said spool, and a drag mechanism including an adjuster for adjusting a thrust applied from said drag washer to said spool, and said second divided cover includes a drag lever engageable with said adjuster when said second divided cover is in said closed position.

7. A fishing reel according to claim 6, wherein said adjuster comprises a screw and a plurality of engaging recesses, said drag lever having an engaging end selectively engageable with at least one of said recesses.

* * * * *